Aug. 11, 1953

P. HAGEN 2,648,350

MIXTURE CONTROL VALVE FOR FAUCETS

Filed April 16, 1947

INVENTOR.

BY *Peter Hagen*

Aug. 11, 1953 P. HAGEN 2,648,350
MIXTURE CONTROL VALVE FOR FAUCETS
Filed April 16, 1947 3 Sheets-Sheet 2

INVENTOR.
BY Peter Hagen

Aug. 11, 1953    P. HAGEN    2,648,350
MIXTURE CONTROL VALVE FOR FAUCETS
Filed April 16, 1947    3 Sheets-Sheet 3

INVENTOR.
BY *Peter Hagen*

Patented Aug. 11, 1953

2,648,350

UNITED STATES PATENT OFFICE 2,648,350

MIXTURE CONTROL VALVE FOR FAUCETS

Peter Hagen, Sharon Hill, Pa.

Application April 16, 1947, Serial No. 741,857

5 Claims. (Cl. 137—630.16)

(Granted under Title 35, U. S. Code (1952), sec. 266)

This invention relates to new and useful improvements in mixture-control valves for faucets and similar devices, and relates more particularly to mixture-control valves having a single control handle to effect flow of two separate liquids either singly or jointly in desired proportion. To produce this effect, a preferred embodiment of the invention comprises a body member carrying a valve-in-valve mechanism, a stop arrangement having cooperable relation to the aforesaid mechanism and also to a plurality of inlet ports therein disposed, and a removable sealing closure arranged to form an external portion of the body member.

The subject device eliminates leakage that occurs because of defective valve seats and worn sealing washers, and provides a positive shut-off valve that is subject to a minimum of wear because of its structural arrangement. Furthermore, for shut-off purposes, the mixture-control valve dispenses with the customary screw-threaded control shafts or stems, which must necessarily interengage with corresponding screwthreads formed within the body member. As a result, the frequent replacement of defective shafts or stems, and the periodic replacement of the entire unit because of worn or stripped screwthreads within the body member, are additional factors eliminated by the invention.

The neutral center hereinafter referred to in the specification signifies the off position or fully closed attitude of the mixture-control valve, the invention being defined with reference to a combination water faucet wherein cold water is obtainable through rotation of the control handle in a clockwise direction from the neutral center, and hot water is obtainable through counterclockwise rotation of the control handle from the same position. It is to be understood, of course, that valve arrangements that operate oppositely can be employed.

The valve-in-valve mechanism is provided with a plurality of inlet ports that release a desired volume of flow of either cold or hot water, with such volume of flow being effected through rotation of the control handle from the neutral center position and with such rotation being in the direction of the selected element. For a mixture of the two elements, rotation of the control handle from neutral center in a counter-clockwise direction delivers hot water, the volume of flow increasing in proportion to the extent of such rotation. In this phase, rotation can conclude at any attitude within the arc of travel that produces the necessary volume of flow. Cooler flow is obtainable by reversing the direction of rotation of the control handle until the proper temperature is forthcoming.

Another feature is the provision of structure whereby the volume of flow of hot water remains constant during the interim that the temperature of the water is decreased to the desired tepidity by reversing the direction of rotation of the control handle.

The principal object of the present invention is to provide a mixture-control valve comprising one control handle by which two separate liquids are regulated to permit flow of each liquid through an independent inlet port into a valve chamber, said liquids being free to flow from said chamber into a common outlet for disposal.

Another object is to provide a mixture-control valve having means for individual selective control over the two separate liquids at the inlet ports of said valve.

Still another object is to provide a mixture-control valve having the characteristics heretofore defined wherein two separate liquids can be mixed in the valve chamber thereof, and the volume of flow during such mixture can be regulated to produce any capacity of discharge by means of the control handle provided therefor.

An additional object is to provide a mixture-control valve whereby, through rotation of the control handle, the interfusion of liquids can be regulated to provide a desired ratio between the two separate liquids during simultaneous flow into the valve chamber through their respective inlet ports.

Another object is to provide a mixture-control valve of the aforementioned type that is capable of producing a regulated mixture between two separate liquids of different temperatures, wherein the volume of flow remains constant while temperature is diminished or increased by means of the control handle.

Still another object is to provide a mixture-control valve having the features set forth that embodies a relatively compact over-all construction, thereby making it entirely suitable for adaption to water faucets, and similar devices, in lieu of arrangements that utilize dual-control handles for effecting the same purpose.

A further object is to provide a mixture-control valve having a positive shut-off device that is substantially fluid-tight against the leakage of liquid flowing therethrough, and that requires a minimum of maintenance during the service thereof.

A still further object is to provide a mixture-control valve characterized by a minimum number of parts of relatively simple and inexpensive construction, thereby making it adaptable to manufacture at comparatively low cost.

These and other objects of the invention, and the various features of the construction and the operation thereof, are hereinafter fully set forth and described with reference to the accompanying drawings, in which.

Figure 2:
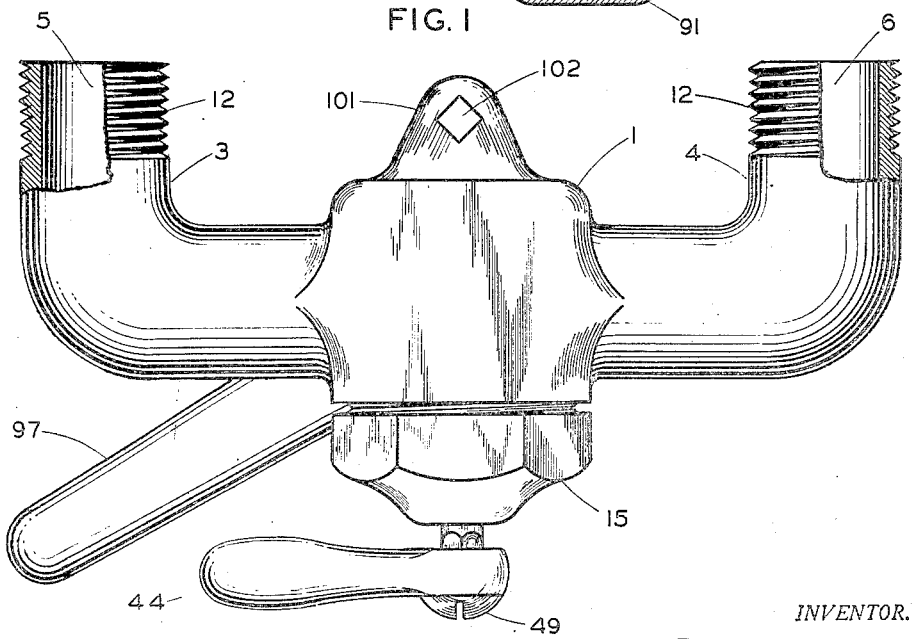
Fig. 2 is a plan view of one arrangement of the mixture-control valve installed on a combination water faucet, or similar device.
Figures 7, 8:
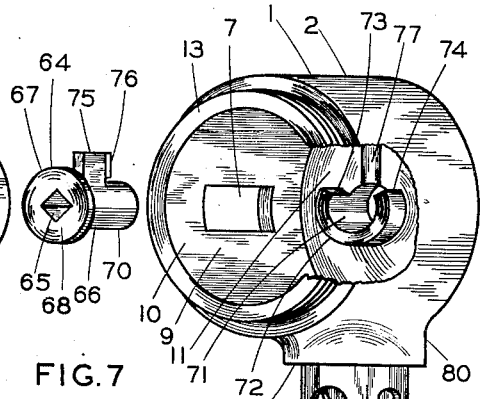
Fig. 7 is a perspective view of the pivot sleeve, showing the stop that limits rotation of the valve mechanism, the bearing surface at the one end, the bearing flange at the other end, and the internal locking means that extends longitudinally therethrough.
Figure 9:
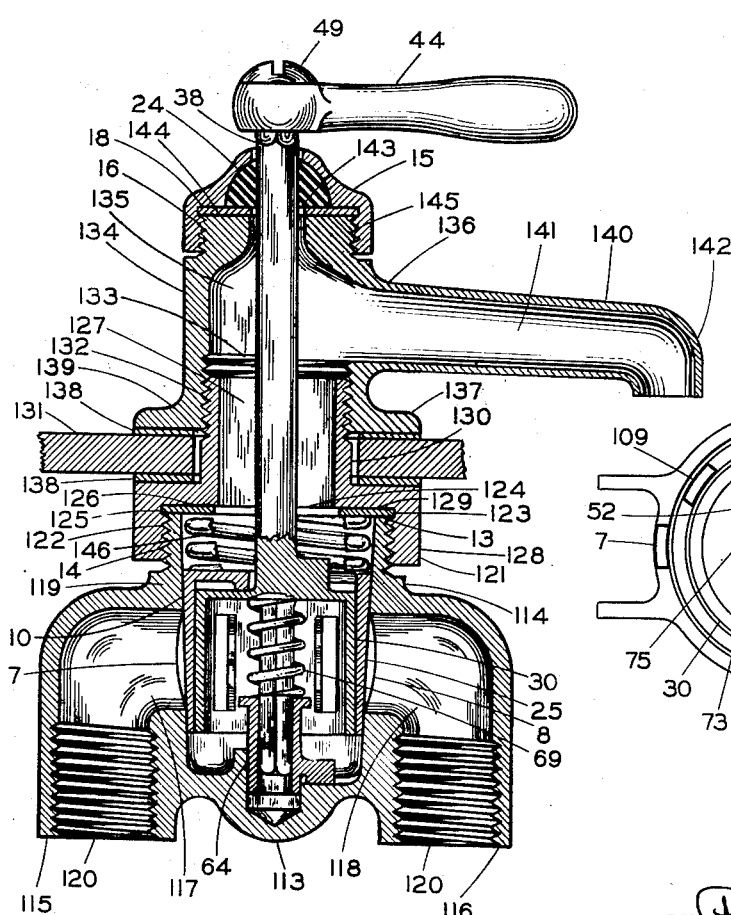
Figure 10:
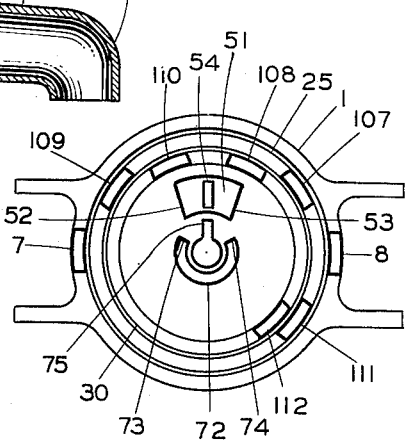

Fig. 8 is a perspective view of the valve housing applied to a combination water faucet, or similar device, of the type shown in Fig. 2, illustrated in fragmentary section to show one inlet port thereof, the bearing boss and angularly inclined shoulders that cooperate with the limit stop shown in Fig. 7, and the recessed seat located perpendicularly in the wall between the shoulders to define neutral center of the mechanism;

Fig. 9 is a sectional view longitudinally through a modified arrangement of the mixture-control valve mounted in a combination water faucet, or similar device; and, Fig. 10 is a diagrammatic plan showing the arrangement of inlet ports, and the relation of the regulator stops, the limit stops, and the inlet ports governed thereby.

Similar numerals refer to similar parts throughout the several views.

As shown in Figs. 1 to 4, a mixture-control valve constructed according to the present invention is provided with a valve housing 1 having a substantially cylindrical surface 2. Arranged to extend transversely outward from the surface 2 are a pair of cylindrical members 3 and 4 having bores or passages 5 and 6 respectively, wherethrough two separate liquids are adapted to flow to inlet ports 7 and 8 respectively. Ports 7 and 8 are disposed in a wall portion 9, which surrounds a tapered seat 10 bored coaxially to a predetermined depth to terminate therein at a rearmost wall 11 arranged normally to the longitudinal axis through the valve housing 1 (see Fig. 8). Members 3 and 4 are arranged in linear opposition. External screwthreads 12 on said members 3 and 4 provide means to attach the mixture-control valve to fixtures, or other devices, that form a portion of the supply sources leading thereto. Alternatively, the members 3 and 4 can be aligned in a manner other than that indicated in Fig. 2.

Annular bearing 13 is seated on the lip of wall portion 9 (Fig. 8). External screwthreads 14 on said wall portion carry a sealing nut 15 having internal screwthreads 16, said nut 15 defining a recessed portion 17 therein extended. To render the joint fluid tight between the respective screwthreads, 14 and 16, of the valve housing 1 and of the sealing nut 15, an annular sealing gasket 18 is disposed in a circumferential undercut 19 positioned to form an extension of the maximum diameter of the screwthreads 16. Said undercut forms a wall 20 that provides a bearing for seating of the annular sealing gasket 18. Thus, a wrench applied to the polygonal surface 21 of the sealing nut 15 for tightening said nut upon the screwthreads 14 of the valve housing 15, compresses and forces the annular sealing gasket 18 into fluid-tight sealing contact with the adjacent wall 20 of the sealing nut 14 and with the related bearing surface 13 of the valve housing 1. The crown 22 of the sealing nut 15 provides a hemispherical seat 23 wherein is seated conformably a resilient packing element 24 of like hemispherical shape.

Figure 1:
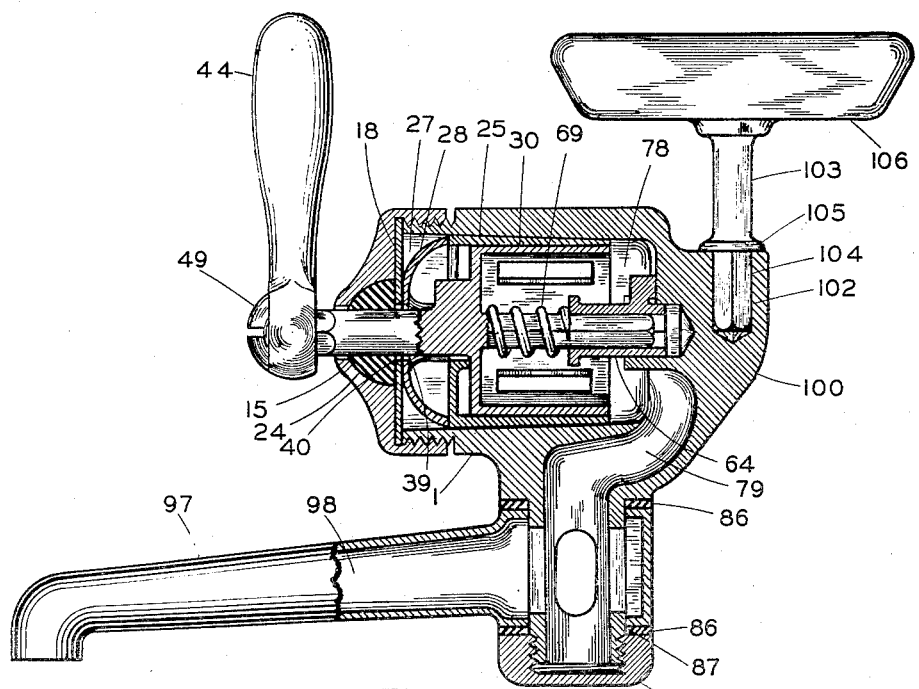
Fig. 1 is a sectional view longitudinally through a mixture-control valve installed on a combination water faucet of the type illustrated in Fig. 2.

A control valve 25 (see Figs. 3 and 5) having an external tapered seat 26 is carried rotatably in the tapered seat 10 of the valve housing 1. Frontally of the control valve 25 in the area indicated at 27 (see Fig. 1) is interposed a spring 28 of spider-like configuration (which otherwise may be a spring of the type illustrated in Fig. 9) said spring 28 bearing at the one end against the sealing gasket 18, the projecting legs 29 of the spring 28 being in compressive engagement with the peripheral rim of the control valve 25. In the arrangement so presented, the control valve 25 at all times is maintained at the extreme of longitudinal extension into the surrounding tapered seat 10 of the valve housing 1 to provide a fluid-tight sealing contact between the surfaces of the mating tapered seats, and a like seal is effected between the tapered seat 26 of the control valve 25 and the inlet ports 7 and 8 of the valve housing 1 when all members are positioned in their operable attitudes as illustrated in Fig. 1 and the valve mechanism is positioned at neutral center.

Figure 6:
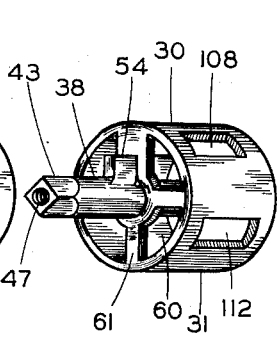
Fig. 6 is a perspective view of the mixture valve, showing the plurality of inlet ports thereof, the male regulator stop coupled to the actuating shaft, and the valve wall at the juncture therebetween.

Mixture valve 30 (see Figs. 3 and 6) has its external cylindrical surface 31 inserted longitudinally into the control valve 25. Annular seat 32 of valve 25 is bored coaxially through the valve end 33. Said seat 32 is likewise constructed with a uniform diameter to produce a close seat in relation to the external surface 31 of the mixture valve 30. Valve 30 is free to rotate in valve 25. Arranged on the coaxial center of the wall 34 of valve 25 and projecting therefrom is an annular bearing 35 having a flat surface 36 that provides a bearing surface for the mixture valve 30 when the latter member is operationally positioned within the control valve 25. Frictional contact between the adjacent parallel wall portions of the mixture valve 30 and the control valve 25 is minimized by said bearing 35. Through the wall 34 and through the annular bearing 35 of the control valve 25 is a clearance bore 37. Actuating shaft 38 of the mixture valve 30 projects through said bore 37. Axially of the actuating shaft 38 are a series of clearance bores 39, 40 and 41 provided respectively in the spring 28, the sealing gasket 18 and the sealing nut 15. The bore 42 provided in the packing element 24 is necessarily not in excess of the diameter of the actuating shaft 38, in order to provide a fluid-tight packing seal.

The actuating shaft 38, at the upper end thereof, is provided with flats 43, which can be square as illustrated in the drawings, or can comprise a plurality of serrations extending entirely around the circumference of the actuating shaft 38, said serrations paralleling the axis of said shaft. The flats 43 terminate at a shoulder portion that limits the position of a control handle 44 seated thereon. The control handle 44 is formed with a hub 45 having internal flats 46 adapted to nest over the flats 43 of the actuating shaft 38. Axially extended into the actuating shaft 38 at the outermost portion are internal screwthreads 47 that engage the external screwthreads 48 of the retaining screw 49, thus providing means to bear the screw head 50 against the hub 45 for maintaining the control handle 44 assembled rigidly on the actuating shaft 38.

Figure 3:
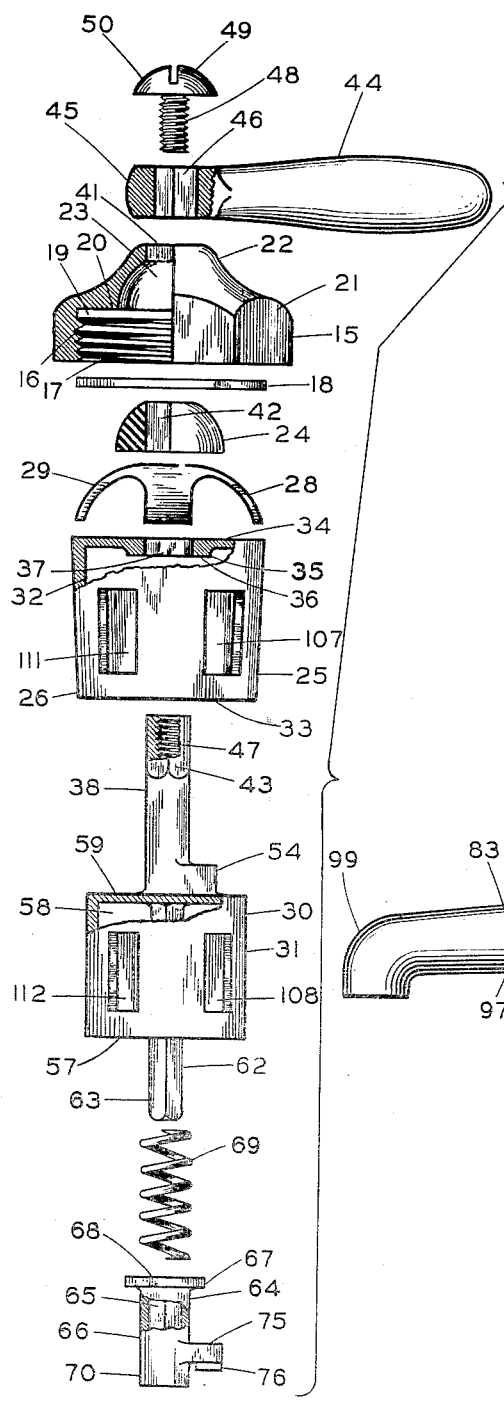
Fig. 3 is an exploded elevation of the mixture-control valve mechanism, with portions of some members illustrated in fragmentary section.
Figure 5:
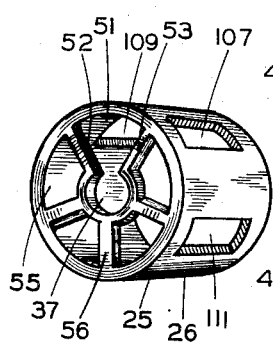
Fig. 5 is a perspective view of the control valve, showing the plurality of inlet ports thereof and the female regulator stop disposed in the end thereof.

In the wall 34 of the control valve 25, as depicted in Figs. 3 and 5, there is a female regulator stop 51. Said stop 51 comprises a sectoral opening extending between the bore 37 and the annular seat 32, and along radii of the sectoral opening is a shoulder 52 and a shoulder 53 having an angular displacement of about forty (40) degrees as opposed one to the other. Each shoulder 52 and 53 is displaced from its respective radial axis to a plane outwardly situated in parallelism therewith, with such displacement for each shoulder 52 and 53 being equal to half the thickness of a cooperable male regulator stop 54 of the mixture valve 30. The aforementioned angular relation of the shoulders 52 and 53, one to the other, has direct association with a plurality of inlet ports, as hereinafter defined, which are embodied in the three members comprising the valve housing 1, the control valve 25, and the mixture valve 30. When the mixture valve 30 is seated in the control valve 25, the male regulator stop 54 projects through the female regulator stop 51. Thus, a stationary interval is provided for the control valve 25 during a portion of the cycle of rotation of the mixture valve 30. Thereafter, the male regulator stop 54 contacts either the shoulder 52 or the shoulder 53, depending on the direction of rotation of the handle 44, and rotates both valve members 25 and 30.

A plurality of sectoral passages 55 wherethrough the liquids are adapted to flow are defined by a plurality of radial spokes or webs 56 that make the valve 25 rigid.

The mixture valve 30 nests fully within the control valve 25. Inwardly extending through the valve end 57 of the mixture valve 30 is an annular recess 58. The annular recess 58 terminates at wall 59. Projecting longitudinally from the wall 59 is the actuating shaft 38, the male regulator stop 54 extending from the surface of said actuating shaft 38 and from the wall 59, with said stop 54 extending radially from shaft 38 and lying parallel to said shaft 38. The height of the male regulator stop 54 permits rotational clearance thereof when operated within the confines of the female regulator stop 51 of the control valve 25, and the length thereof produces engagement with the shoulders 52 and 53 of the female regulator stop 51 when the mixture valve 30 is positioned in the control valve 25 and rotated therein. The valve wall 59 of the mixture valve is provided with a plurality of sectoral passages 60 wherethrough liquids are adapted to flow. Said passages 60 are defined by a plurality of radial spokes or webs 61 that make the valve structure rigid.

A pivot shaft 62 (see Fig. 3) extends parallel to shaft 38 and beyond valve end 57, and carries at its end flats 63, which can be square, as indicated on the drawings, or can comprise a plurality of serrations extending entirely around the circumference of the pivot shaft 62 and parallel to the axis thereof to carry a pivot sleeve 64. Complemental internal flats 65 extending through the cylindrical body 66 of pivot sleeve 64 provide means to rotate said pivot sleeve 64 through the pivot shaft 62.

A flange 67 (see Figs. 3 and 7) is formed on one end of the cylindrical body 66. Said flange 67 provides a bearing surface 68 on the outer face thereof. A helical load spring 69 is carried on the pivot shaft 62 for compressive engagement, at the one end, with the wall 59 of the mixture valve 30 to maintain the latter member fully positioned at all times within the confines of the control valve 25, and at the other end to engage compressively with the bearing surface 68 to maintain the pivot sleeve 64 at its outermost working position during rotation. Means to stabilize the mixture valve 30 and the pivot shaft 62 extending therefrom against lateral movement is incorporated on the cylindrical body 66 of the pivot sleeve 64, whereon is formed bearing 70. Said body 66 is rotatable in a complemental female bearing 71 bored axially into annular boss 72.

The annular boss 72 (see Fig. 8) projects inwardly toward the valve chamber formed within the wall 11 of the valve housing 1. The uppermost portion of the annular boss 72 is slotted sectorally at an angle of about sixty (60) degrees on either side of the vertical center, with the slot extending to the surface of the wall 11 to provide a shoulder 73 on the one side and a shoulder 74 on the other side that each functions as a limit stop for the valve mechanism. A male regulator stop 75 is formed on the pivot sleeve 64. When the male regulator stop 75 is rotated, it engages shoulder 73 or shoulder 74, as determined by the direction of such rotation from neutral center, to provide a means to limit rotation of the valve mechanism.

The male regulator stop 75 extends radially from body 66, and parallel the longitudinal axis thereof. The aftermost surface of the male regulator stop 75 is rounded to form a concave seat 76 that mates with a convex seat 77 in the inner surface of the wall 11 of the valve housing 1. Said convex seat 77 is disposed between the shoulder 73 and 74 of the annular boss 72, and retains the valve mechanism in neutral center. The male regulator stop 75 of the pivot sleeve 64 is arranged with the concave seat 76 situated outwardly adjacent to the bearing 70, to permit the said bearing 70 to be seated in the female bearing 71 of the annular boss 72.

The male regulator stop 75 can be displaced from neutral center by rotation of the control handle 44, and can thereafter be rotated until the said stop 75 engages either the shoulder 73 or the shoulder 74 as determined by the direction of such rotation, the limit so reached being the full open position of the valve mechanism in that direction.

A valve chamber 78 (see Fig. 1) is defined between the valve mechanism and the wall 11 of the valve housing 1. Liquids are adapted to flow from said chamber 78 into a communicating outlet 79 that extends through a cylindrical portion 80 (see Fig. 4) that projects downwardly from the lowermost surface of the valve housing 1. A bearing shoulder 81 on said portion 80 extends inwardly to the cylindrical portion 82 of reduced section. Carried on the cylindrical portion 82 is a swingable spigot 83 having a circular body portion 84. A clearance bore 85 extends axially through the circular body portion 84. An annular sealing washer 86 having a bore 87 is interposed between the said bearing shoulder 81 and the adjacent bearing surface 88 that is formed on the uppermost surface of the circular body portion 84. A like annular sealing washer 86 is interposed between the bearing surface 89 that is formed on the lowermost surface of the circular body portion 84 and the adjacent bearing surface 90 of the hexagonal cap-nut 91. The cap-nut 91 has internal screwthreads 92 in annular recess 93, said screwthreads engaging complemental external screwthreads 94 on cylindrical portion 82. The cap-nut 91 seals the outlet 79. The arrangement so defined is such that the combination of members provides a substantially fluid-tight joint yet permits rotation of the swingable spigot 83.

Flow of liquids from the outlet 79 is effected through a plurality of outlet ports 95, of elongated section, in the wall of the cylindrical portion 82, said ports 95 communicating with an annular recess 96 in body portion 84, which entirely surrounds the aforesaid plurality of outlet ports 95. The stem 97 of the swingable spigot 83 projects from the circular body portion 84, and contains a bore or passage 98 which, at the one end, communicates with the annular recess 96 and, at the other end, terminates at a stem portion 99 of elbow-like configuration where the liquids are discharged.

Figure 4:
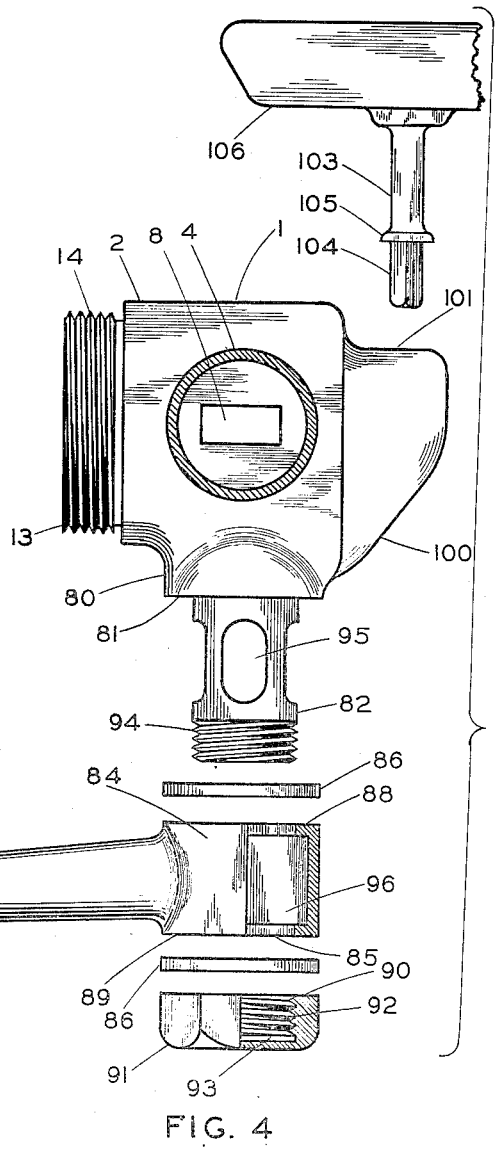
Fig. 4 is an exploded elevation of the mixture-control valve housing as applied to a combination water faucet, or similar device, of the type shown in Fig. 2.

As shown in Figs. 1, 2 and 4, a shoulder projects afterwise of the valve housing 1, said shoulder having formed on the upper-most side thereof a shelf 101. Internal flats 102, which can be square in cross-section, as indicated on the drawings, or can comprise a plurality of vertical serrations disposed circumferentially therein, extend into shoulder 100. A pedestal 103 seated in said flats incorporates complemental flats 104 that extend upwardly to a flange 105. The flange 105 seats upon said shelf 101 to limit extension of the pedestal 103 into the flats 102. A tray 106, or like receptacle, is affixed to the uppermost portion of the pedestal 103 for use, for example, as a soap dish.

Fig. 10 shows diagrammatically the plurality of inlet ports and stops cooperable therewith. Flow of cold water is effected through clockwise rotation of the control handle 44 from neutral center. Upon such rotation, the mixture valve 30 turns clockwise, while the control valve 25 remains stationary until continued clockwise rotation causes the male regulator stop 54 of the mixture valve 30 to contact the corresponding shoulder 53 of the female regulator stop 51 of the control valve 25. That is, first the inlet port 107 of the control valve 25 and the inlet port 108 of the mixture valve 30 are superimposed. Then, upon continued clockwise rotation by the control handle 44, the valves 25 and 30 rotate in unison, and the superimposed inlet ports 107 and 108 pass over the inlet port 8 of the valve housing 1 to permit increasing flow of cold water in proportion to the open area increasing therebetween. When the control handle 44 is extended to the fully open position, as limited by the male regulator stop 75 of the pivot sleeve 64 when in contact with the corresponding shoulder 74 of the annular boss 72, the inlet port 8 of the valve housing 1 and the inlet port 107 of the control valve 25 and the inlet port 108 of the mixture valve 30 are all three fully superimposed to provide maximum flow of cold water into the valve chamber.

When the control handle 44 is rotated counterclockwise from the fully open position to neutral center, the control valve 25 remains stationary at the fully open position during the interim that the male regulator stop 54 is displaced from contact with the shoulder 53 of the female regulator stop 51 towards contact with the shoulder 52 of the female regulator stop 51, while the mixture valve 30 closes the area existing between the inlet port 108 thereof and the adjacent inlet port 107 of the control valve 25 to decrease gradually flow of cold water, so that the two related inlet ports 107 and 108, at the extent of the interval so occurring through the cycle of reversed rotation, are closed fully to further flow of cold water. When the control handle 44 has been returned to neutral center of the valve mechanism, the inlet port 107 of the control valve 25 is displaced beyond further communication with the inlet port 8 of the valve housing 1 to provide a positive shut-off for the cold water.

Flow of hot water is effected through counterclockwise rotation of the control handle 44 from neutral center. Through such rotation, the mixture valve 30 is rotated counterclockwise while the control valve 25 remains stationary until the male regulator stop 54 of the mixture valve 30 contacts the corresponding shoulder 52 of the female regulator stop 51 of the control valve 25. At the conclusion of such interval, the inlet port 109 of the control valve 25 and the inlet port 110 of the mixture valve 30 are superimposed. Upon continued counterclockwise rotation, the valves 25 and 30 rotate in unison, and the superimposed inlet ports 109 and 110 pass over the inlet port 7 of the valve housing 1 to permit flow of hot water in proportion to the open area increasing therebetween. When the control handle 44 is extended to the fully open position, as limited by contact of the male regulator stop 75 of the pivot sleeve 64 with the corresponding shoulder 73 of the annular boss 72, the inlet port 7 of the valve housing 1 and the inlet port 109 of the control valve 25 and the inlet port 110 of the mixture valve 30 are all three superimposed fully to provide maximum flow of hot water into the valve chamber.

When the control handle 44 is rotated clockwise from the fully open position to neutral center, the control valve 25 remains stationary at the fully open position until the male regulator stop 54 contacts the shoulder 53 of the female regulator stop 51. Meanwhile, the mixture valve 30 closes the area existing between the inlet port 110 thereof and the adjacent inlet port 109 of the control valve 25 to decrease gradually flow of hot water, until inlet ports 109 and 110, at the extent of the interval, are closed fully to further flow of hot water. When the control handle 44 has been rotated clockwise to neutral center of the valve mechanism, the inlet port 109 of the control valve 25 is displaced beyond further communication with the inlet port 7 of the valve housing 1 to provide a positive shut-off for the hot water.

To provide simultaneous flow of cold and hot water, the control handle 44 is rotated counterclockwise to the fully open position, where the inlet port 7 of the valve housing 1 and the inlet port 109 of the control valve 25 and inlet port 110 of the mixture valve 30 are all three superimposed fully, thus providing maximum flow of hot water into the valve chamber. Another inlet port 111 is provided in the control valve 25 at the cold water inlet, said port 111 being adapted to be fully superimposed over the inlet port 8 of the valve housing 1. Still another inlet port 112 is provided in the mixture valve 30 at the cold water inlet, said port 112 lying marginally upward of the topmost edge of the inlet port 111 of the control valve 25. Thus, at the hot water inlet, the inlet ports 7, 109 and 110 are superimposed to provide maximum flow of hot water, whereas, at the cold water inlet, the inlet port 112 restricts flow of cold water by maintaining a closed area over the superimposed inlet ports 8 and 111.

Maximum flow of hot water can be maintained while providing simultaneous flow of hot and cold water, so that the flow of the two separate liquids can be regulated to any temperature. To obtain such simultaneous flow of the two separate liquids at desired temperature, the control handle 44 is rotated counterclockwise until the desired volume of flow is forthcoming. Should cooler flow at that volume of flow be desired, the control handle 44 is rotated clockwise toward neutral center. By such rotation of the control handle 44, the control valve 25 remains stationary while the male regulator stop 54 recedes from contact with the shoulder 52 of the female regulator stop 51 to assume contact with the shoulder 53 of the female regulator stop 51. During such interval the inlet port 110 of the mixture valve 30 recedes from a superimposed attitude over the inlet port 109 of the control valve 25 to decrease the flow of hot water in proportion to the inlet area there diminishing. Meanwhile, the inlet port 112 of the mixture valve 30 at the cold water inlet advances over the inlet port 111 of the control valve 25 to increase the flow of cold water in proportion to the inlet area there enlarging. During the interval that the control valve 25 has remained stationary, the inlet port 112 of the mixture valve 30 at the cold water inlet has been fully superimposed by the related cold water inlet ports 8 and 112, whereas the inlet port 110 of the mixture valve 30 at the hot water inlet has receded to a position beyond further communication with the related hot water inlet ports 7 and 109. The decrease of inflow of one liquid and the increase of inflow of the other liquid are in direct ratio.

Thus, the subject structure provides effective means for regulating the mixture-control valve to provide individual selective or combined flow, at desired volume, of two separate liquids for discharge thereof through a common outlet. Such volume of flow remains constant during the regulating process by which the temperature of the mixture is varied as desired, and such volume can be increased or decreased as desired. Furthermore, when rotating the control handle 44 to neutral center, positive shut-off is provided between the valve housing 1 and the control valve 25, so that said members are sealed against the leakage of liquids flowing into the mixture-control valve at high pressures.

Another form of the invention adapted for bulkhead or similar mounting is shown in Fig. 9.

A mixture control valve constructed according to the present invention as disclosed in Fig. 9 comprises essentially a plurality of members associated with a valve housing 113 having a cylindrical surface 114 from which depends a pair of inlet members 115 and 116 of elbow-like formation. Bores or passages 117 and 118 respectively in said inlet members 115 and 116 permit two separate liquids to flow to communicating ports 7 and 8 respectively, said ports being disposed in a wall portion 119 that surrounds the tapered seat 10 bored coaxially into the valve housing 113. At the outermost extremities of each member 115 and 116 are internal screwthreads 120 whereby the mixture control valve is attachable to fixtures, or other devices, that form a portion of the supply sources leading thereto.

Circumferentially of the valve housing 113, and surrounding the uppermost portion thereof are external screwthreads 14 that carry connector 121 having internal screwthreads 122 therein. To render the joint fluid tight between the screwthreads 14 and 122 of the valve housing 113 and the connector 121, respectively, an annular sealing gasket 123, provided with a substantial bore 124 therethrough for liquids to flow, is disposed in a circumferential undercut 125 that defines an extension of the major diameter of the internal screwthreads 122. Said gasket 123 forms a bearing shoulder 126. A bore or passage 127 that extends axially through the connector 121 encloses actuating shaft 38 of the mixture valve 30. The arrangement so defined is such that a wrench applied to the polygonal external surface 128 of the connector 121, for tightening of the screwthreads 122 of the latter member upon the external screwthreads 14 of the valve housing 113, compresses and forces the annular sealing gasket 123 into fluid tight sealing contact with the bearing shoulder 126 of the connector 121 and with the related bearing surface 13 of the valve housing 113.

The connector 121, at that portion uppermostly of the polygonal external surface 128, incorporates a second bearing shoulder 129 that abuts an annular collar 130. The annular collar 130 is positioned in an opening of the bulkhead 131, or similar mounting. Above the bulkhead 131 the extending portion of the annular collar 130 is provided with external screwthreads 132 whereon is carried the complemental internal screwthreads 133 formed in the circular body portion 134, said body portion 134 having a bore or passage 135 that extends axially through a portion of the fixed spigot 136.

To render the joint fluid tight between the bulkhead 131 and the bearing shoulder 129 of the connector 121 on the one side, and between the bulkhead 131 and the bearing flange 137 on the other side, annular sealing gaskets 138 are interposed between the aforesaid adjacent bearing surfaces, with the annular sealing gaskets 138 being provided with clearance bores 139 for assembly over the annular collar 130. The arrangement so defined is such that the screwthreads 132 and 133 of the annular collar 130 and of the circular body portion 134, respectively, when tightened one within the other, compress and force the annular sealing gaskets 138 into fluid-tight sealing contact with the adjacent bearing surfaces there provided.

Situated uppermostly of the internal screwthreads 133 of the circular body portion 134 is a stem 140 that projects outwardly, a bore or passage 141 being provided in said stem for liquids to discharge through a spout 142 of elbow-like construction.

The bore or passage 135 of the circular body portion 134 communicates with integral clearance bore 143, and the actuating shaft 38 of the mixture valve 30 extends therethrough. The bore 143 terminates at bearing surface 144, which forms the topmost extent of the fixed spigot 136. Circumferential of the bore 143 and on the circular body portion 134 are external screwthreads 145 that carry the internal screwthreads 16 of the sealing nut 15. A resilient packing element 24 and an annular gasket 18 are seated in said nut 15. To render the joint there formed fluid tight, the arrangement is such that the screwthreads 16 and 145 of the sealing nut 15 and of the circular body portion 134, respectively, compress and force the annular sealing gasket 18 into fluid-tight sealing contact with the adjacent bearing surfaces there provided.

Outwardly of the sealing nut 15, and on the extreme end of the actuating shaft 38, is assembled the control handle 44, which is maintained rigidly thereon by means of a retaining screw 49. Frontally of the control valve 25 is a compression spring 146 that bears at the one end against the periphery of the control valve 25, and bears at the other end against the annular sealing gasket 123 and the bearing shoulder 126 of the connector 121. The compression spring 146 is preferably of coil-like construction, as indicated in Fig. 9 of the drawing. To maintain the mixture valve 30 seated at all times within the confines of the control valve 25 to keep the pivot sleeve 64 at its outermost working position during all phases of rotation, a load spring 69 is interposed compressively to bear against the surfaces therefor provided.

The drawings and the descriptions are merely illustrative of the present invention in two of its many embodiments, and various changes in design, in structure, and in the general arrangement thereof can be made without departing from the scope of the invention.

The invention described herein may be manufactured and used by or for the Government of the United States of America for governmental purposes without the payment of any royalties thereon or therefor.

I claim as my invention:

1. A mixture-control valve for faucets comprising a valve housing defining a chamber having a first and a second inlet port and a discharge port, a first valve seated rotatably in said chamber, said first valve having a first port adapted to register with said first inlet port, a second port adapted to register with said second inlet port simultaneously with said registry of said first port and a third port adapted to register with said second inlet port when said first and second ports are out of such registry, means to rotate said first valve to effect such registry, a second valve seated rotatably in said first valve, said second valve having a first port adapted to register with said first inlet port and with said first port of said first valve, a second port adapted to register with said second port of said first valve and with said second inlet port simultaneously with the removal from registry of said first port of said second valve and said first port, and a third port adapted to register with said second inlet port and with said third port of said first valve simultaneously when all other ports are out of such registry, said second valve being rotatable by said means to effect such registry.

2. A mixture-control valve for faucets comprising a valve housing defining a chamber having a first and a second inlet port and a discharge port, a first spring-loaded valve seated rotatably in said chamber, said first valve having a first port adapted to register with said first inlet port, a second port adapted to register with said second inlet port simultaneously with said registry of said first port and a third port adapted to register with said second inlet port when said first and second ports are out of such registry, means to rotate said first valve to effect such registry, a second spring-loaded valve seated rotatably in said first valve, said second valve having a first port adapted to register with said first inlet port and with said first port of said first valve, a second port adapted to register with said second port of said first valve and with said second inlet port simultaneously with the removal from registry of said first port of said second valve and said first port and a third port adapted to register with said second inlet port and with said third port of said first valve simultaneously when all other ports are out of such registry, said second valve being rotatable by said means to effect such registry.

3. A mixture-control valve for faucets comprising a valve housing defining a chamber having a first and a second inlet port and a discharge port, a first valve seated rotatably in said chamber, said first valve having a first port adapted to register with said first inlet port, a second port adapted to register with said second inlet port simultaneously with said registry of said first port and a third port adapted to register with said second inlet port when said first and second ports are out of such registry, means to rotate said first valve to effect such registry, a second valve seated rotatably in said first valve, said second valve having a first port adapted to register with said first inlet port and with said first port of said first valve, a second port adapted to register with said second port of said first valve and with said second inlet port simultaneously with the removal from registry of said first port of said second valve and said first inlet port and a third port adapted to register with said second inlet port and with said third port of said first valve simultaneously when all other ports are out of registry, said second valve being rotatable by said means to effect such registry and means to rotate said second valve through a predetermined angle without rotating said first valve.

4. A mixture-control valve for faucets comprising a valve housing defining a chamber having a first and a second inlet port and a discharge port, a first valve seated rotatably in said chamber and sealing said inlet ports in one position, said first valve having a first port adapted to register with said first inlet port, a second port adapted to register with said second inlet port and a third port adapted to register with said second inlet port simultaneously with the registry of said first port with said first inlet port, means to rotate said first valve to effect such registry, a second valve seated rotatably in said first valve and sealing said first port of said first valve in one position, and sealing said second and third ports of said first valve in another position, said second valve having a first port adapted to register with said first port of said first valve and adapted to register with both said first port of said first valve and said first inlet port, a second port adapted to register with said second port of said first valve and adapted to register with both said second port of said first valve and said second inlet port and a third port adapted to register with said third port of said first valve and adapted to register with both said third port of said first valve and said second inlet port, said second valve being rotatable by said means to effect such registry.

5. A mixture-control valve for faucets comprising a valve housing defining a conical chamber having a first and a second inlet port at opposite portions of the wall of said chamber and a discharge port intermediate said inlet ports, the floor of said chamber containing a concave seat and a pair of limit stops extending radially thereon, a first conical valve seated compressibly and rotatably in said chamber and sealing said inlet ports in one position, said first valve having a first port adapted to register with said first inlet port, a second port adapted to register with said second inlet port and a third port adapted to register with said second inlet port simultaneously with the registry of said first port with said first inlet port, said first valve having a pair of limit stops extending radially on a ribbed face thereof distal said floor, a second cylindrical valve seated compressibly and rotatably in said first valve and sealing said first port of said first valve in one position and sealing said second and third ports of said first valve in another position, said second valve having a first port adapted to register with said first port of said first valve and adapted to register with both said first port of said first valve and said first inlet port, a second port adapted to register with said second port of said first valve and adapted to register with both said second port of said first valve and said second inlet port and a third port adapted to register with said third port of said first valve and adapted to register with both said third port of said first valve and said second inlet port, said second valve having an axial shaft, said shaft carrying a first male stop adapted to register with said limit stops of said first valve to rotate said first valve and carrying a second male stop adapted to register with said limit stops of said housing, said second male stop having a convex portion adapted to engage said concave seat removably, and means exterior said housing to rotate said shaft.

PETER HAGEN.

References Cited in the file of this patent

UNITED STATES PATENTS

| Number | Name | Date |
|---|---|---|
| 446,341 | Goehde | Feb. 10, 1891 |
| 960,558 | Koken | June 7, 1910 |
| 1,078,252 | Cacko | Nov. 11, 1913 |
| 1,504,498 | Petcher | Aug. 12, 1924 |
| 1,629,821 | Jacovatos | May 24, 1927 |
| 1,642,623 | Niven | Sept. 13, 1927 |
| 1,801,847 | Carder | Apr. 21, 1931 |
| 1,943,865 | Hennessey | Jan. 16, 1934 |